US012770065B1

(12) United States Patent
Shen et al.

(10) Patent No.: US 12,770,065 B1
(45) Date of Patent: Oct. 20, 2026

(54) MOBILE-NATIVE RENDERING FOR THREAD ENTRIES

(71) Applicant: Notion Labs, Inc., San Francisco, CA (US)

(72) Inventors: Andrew Shen, New York, NY (US); Joseph Bergman, Brooklyn, NY (US); Mai Ho, Brooklyn, NY (US); Rostislav Semenov, Long Island City, NY (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/388,921

(22) Filed: Nov. 13, 2025

Related U.S. Application Data

(60) Provisional application No. 63/880,947, filed on Sep. 12, 2025.

(51) Int. Cl.

| | |
|---|---|
| ***G06N 20/00*** | (2019.01) |
| ***G06F 9/54*** | (2006.01) |
| ***G06F 16/3329*** | (2025.01) |
| ***G06F 40/35*** | (2020.01) |
| *G06F 9/30* | (2018.01) |

(52) U.S. Cl.
CPC ............. *G06N 20/00* (2019.01); *G06F 9/542* (2013.01); *G06F 16/33295* (2025.01); *G06F 40/35* (2020.01); *G06F 9/3009* (2013.01)

(58) Field of Classification Search
CPC ........ G06F 9/3009; G06F 9/542; G06F 3/048; G06F 16/33295; G06F 16/9535; H04L 51/02; G06N 5/022
See application file for complete search history.

(56) References Cited

U.S. PATENT DOCUMENTS

| | | | | |
|---|---|---|---|---|
| 10,452,748 | B2 | 10/2019 | Clinton et al. | |
| 12,505,219 | B1 * | 12/2025 | Huang | G06F 21/57 |
| 2008/0263426 | A1 | 10/2008 | Zaleski et al. | |
| 2009/0210376 | A1 * | 8/2009 | Lorge | G06N 5/04 706/47 |
| 2012/0166655 | A1 | 6/2012 | Maddali et al. | |
| 2016/0269326 | A1 * | 9/2016 | Ji | G06F 16/3329 |
| 2019/0028520 | A1 | 1/2019 | Nawrocki | |
| 2021/0383343 | A1 * | 12/2021 | Mangtani | H04L 43/0823 |
| 2023/0092702 | A1 * | 3/2023 | Mao | G06F 40/30 704/9 |
| 2024/0031321 | A1 * | 1/2024 | Templeton | H04L 51/046 |
| 2024/0111399 | A1 | 4/2024 | Chung et al. | |

(Continued)

OTHER PUBLICATIONS

Miri, et al. "Secure Textual Data Deduplication Scheme Based on Data Encoding and Compression" IEEE, (Year: 2019), 5 pgs.

*Primary Examiner* — James D. Rutten
(74) *Attorney, Agent, or Firm* — Dorsey & Whitney LLP

(57) ABSTRACT

Disclosed herein are systems, methods, and computer-readable media for rendering thread entries on a mobile device. In some embodiments, a request to generate a thread and a thread identifier are provided and stored in a local thread record. A mobile device may then subscribe to one or more notifications associated with the thread identifier and receive, via a message store, a notification indicating the thread has been updated. Updated thread information may be received from a web server and the local thread record may be updated accordingly. One or more entries from the thread may then be displayed on the mobile device via a user interface.

20 Claims, 10 Drawing Sheets

(56) References Cited

U.S. PATENT DOCUMENTS

| | | | | |
|---|---|---|---|---|
| 2025/0103962 | A1* | 3/2025 | Turley | G06N 20/00 |
| 2025/0141978 | A1* | 5/2025 | Ray | H04L 67/60 |
| 2025/0193132 | A1* | 6/2025 | Henry | H04L 51/02 |

* cited by examiner

MOBILE-NATIVE RENDERING FOR THREAD ENTRIES

CROSS-REFERENCE TO RELATED APPLICATION(S)

This application claims priority to and the benefit of U.S. Provisional Application No. 63/880,947, titled "MOBILE-NATIVE RENDERING FOR WORKSPACE APPLICATION BLOCKS AND THREAD ENTRIES" filed on Sep. 12, 2025, the content of which is herein incorporated by reference in its entirety.

BACKGROUND

A mobile application is a software application designed to run on a mobile computing device such as a phone, tablet, or watch. Mobile applications often stand in contrast to web applications, which run in mobile web browsers rather than directly on the mobile device. Mobile computing devices may access data that is stored by the mobile device itself, without the need for a connection. In some circumstances, mobile users must be able to work without a network connection due to poor or even non-existent connections.

Artificial intelligence (AI) refers to the capability of computational systems to perform tasks typically associated with human intelligence, such as learning, reasoning, problem-solving, perception, and decision-making. Generative artificial intelligence (sometimes called Generative AI or Gen AI) is a subfield of AI that uses generative models to produce text, images, videos, or other forms of data. In recent years, there has been a significant proliferation of software tools that employ AI models, including generative AI models, to interpret natural language queries provided as input by a human user and return a natural language response as output. Agentic AI is a class of artificial intelligence that focuses on autonomous systems that can make decisions and perform tasks with or without human intervention.

BRIEF DESCRIPTION OF THE DRAWINGS

Reference will now be made, by way of example, to the accompanying drawings which show example embodiments of the present application, and in which.

Figure 1:
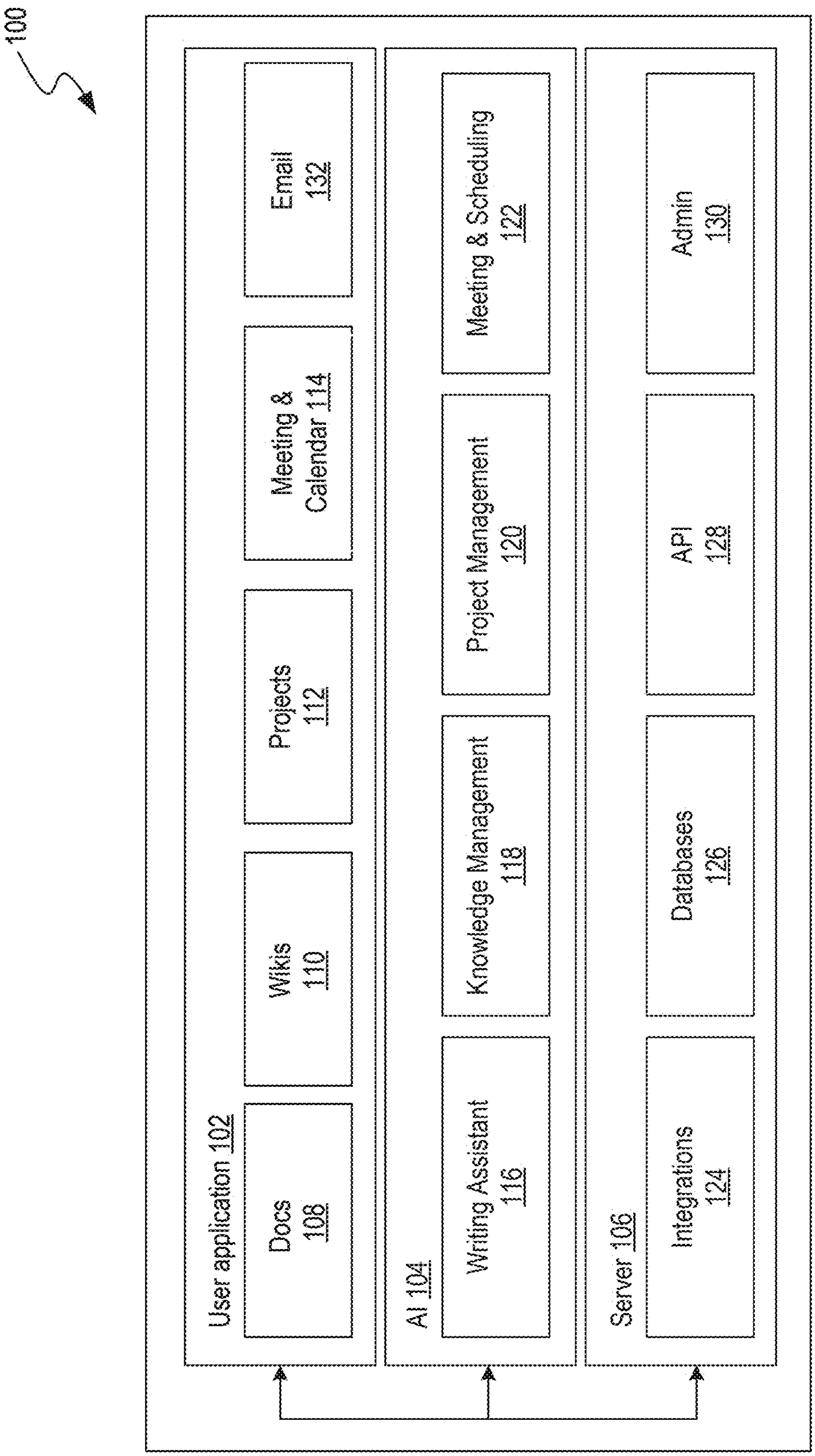
FIG. 1 is a block diagram illustrating a platform that may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing productivity and workspace applications struggle to effectively store and represent interactions or communication sessions between a user and an AI agent on a mobile device. Certain existing implementations of agentic AI on mobile applications store all message data relating to previous or ongoing communication sessions between a user and an AI agent on servers or other components/devices separate from the mobile device hosting the mobile application. This can lead to slow data retrieval and/or response times for the AI agent in communication with the user. Further, in a scenario in which the mobile device is disconnected from the internet and/or the server, the user may be unable to access any previous communication sessions until the connection is restored. Existing mobile devices, such as smartphones, tablets, watches, and other devices, typically have small screens, especially compared to laptops, desktop computers, and other equipment with larger display screens. Once data is accessed by the user, existing productivity and workspace applications on mobile devices often struggle to display the data, including text, images, and databases, so that the data is legible to the user.

Further, manipulating, editing, and creating content on existing workspace applications on a mobile device is challenging for the user, due to small font sizes, minuscule button selection sizes, and difficulty faced by the mobile device in rendering user inputs properly. A simplified interface within a workspace application would provide users with significant benefits when creating and editing content. Specifically, an interface designed around text- and/or voice-based interactions between a user and an AI agent, wherein the user inputs a prompt or command to the AI agent to create new or edit existing content within the workspace application, would be advantageous over manual user entry.

The present technology provides for systems, methods, and computer-readable media for updating, storing, and displaying thread information corresponding to communication sessions between a user and an AI agent on a mobile device. In some embodiments, during the communication session, the user inputs a prompt to a user interface (UI). The prompt may include instructions for the AI agent to complete a specific task within the workspace application. In these and other embodiments, the prompt, along with a list of block types able to be rendered on the mobile device, is provided to the AI agent. A further description of blocks and block types will be provided in relation to the "block data model" below. The AI agent may perform an operation to provide a response to the prompt, which may be output as one or more blocks. In some embodiments, the blocks are output in a markup language representation. The markup language representation may include certain stylistic components specific or preferable to a web-based implementation of the workspace application. The markup language representation of the one or more blocks may be processed by a markup parser, which may convert the markup language representation into a data serialization representation (e.g., JSON format).

In some embodiments, the data serialization representation of the one or more blocks is received by the mobile device, upon which a set of mobile style modifications may be applied to the data serialization representation for display to the user via a Ul. The set of mobile style modifications may include font style and/or font size modifications. The present technology overcomes the limitations of many current workspace applications by providing display to the user, via a communication interface, of a thread of a communication session between the user and the AI agent, wherein the display is modified specifically for mobile devices. Additionally or alternatively, the use of a communication interface for the user to input prompts for an AI agent to complete actions within the workspace application, rather than the user performing the actions themselves, greatly enhances and simplifies the user experience in the workspace application on the mobile device.

In some embodiments, the workspace environment enables the user to interact with an AI agent through prompts entered via a UI, which may be accessed on a mobile device. Upon the receipt of a prompt, the system may initiate the creation of a thread, which is a persistent record of the ongoing conversation or sequence of operations between the user and the AI agent. In some embodiments, alongside the prompt, the AI agent is provided with configuration details that define the AI agent's capabilities, such as enabling custom agents, automations, and integrations. The configuration message may specify which features and permissions are activated for the AI agent. These capabilities can include automations that cause the AI agent to take action based on user activity or events within the workspace or in third-party applications. The set of permissions and set of tools for the AI agent are defined by a list of integrations.

In some embodiments, when a user submits a prompt, context such as the identifier of the current page, database, or other block is provided. The context may be provided automatically by the system or explicitly specified by the user in their prompt. Further, a thread request and a thread identifier may be provided to the AI agent alongside the prompt. In some embodiments, the thread is a persistent record of one or more entries from a transcript. The transcript represents a sequence of operations, wherein each operation is performed by either the user or the AI agent. The transcript may be systematically updated as the user interacts with the AI agent and further responses, AI agent tool steps, and/or AI agent inference steps occur. In some embodiments, the thread is further associated with a version number. In such embodiments, when the version number is updated, a message store on the mobile device may provide an update request to a web server to receive updated thread information, which may include one or more entries in an updated transcript.

In some embodiments, the updated thread information is stored in a local data store of the mobile device as a local thread record. Local storage of the thread provides many benefits to the user and overcomes shortcomings of current workspace applications. In embodiments in which the mobile device is offline (e.g., not connected to the internet), local storage of the thread allows the user to access existing local thread records, including previous interactions between the user and the AI agent. In other embodiments, in which the mobile device is online (e.g., connected to the internet) and able to access the web server, local storage of the thread improves computational efficiency by preventing constant, computationally expensive communication between the mobile device and the web server. In some embodiments, the mobile device is offline, and local thread records are maintained and updated independently, allowing the user to continue working without interruption. Upon reconnection, the system compares version identifiers and data sizes between the local (mobile device) and web server records to determine whether updates are necessary.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
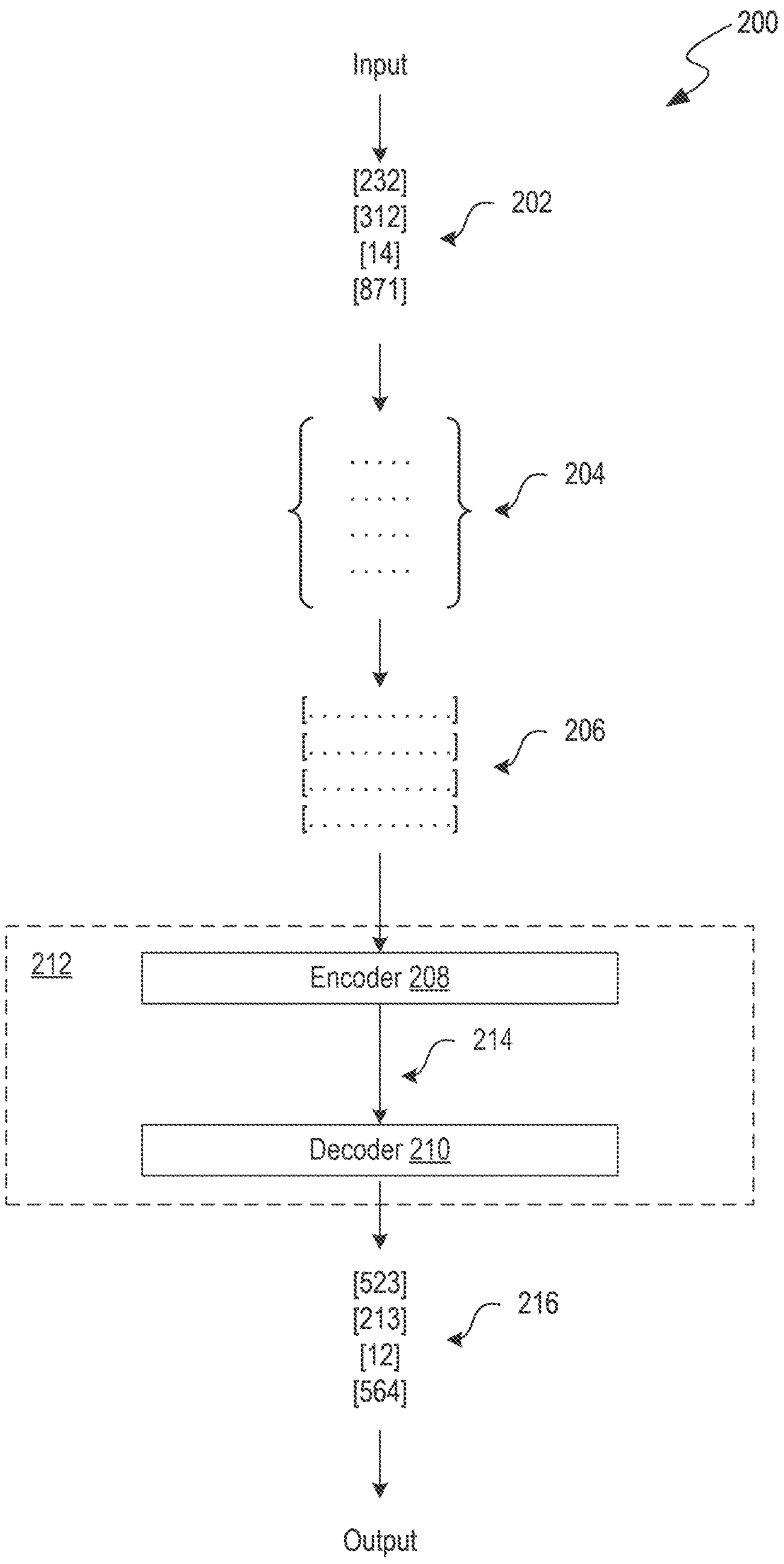
FIG. 2 is a block diagram of a transformer neural network that may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens

202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
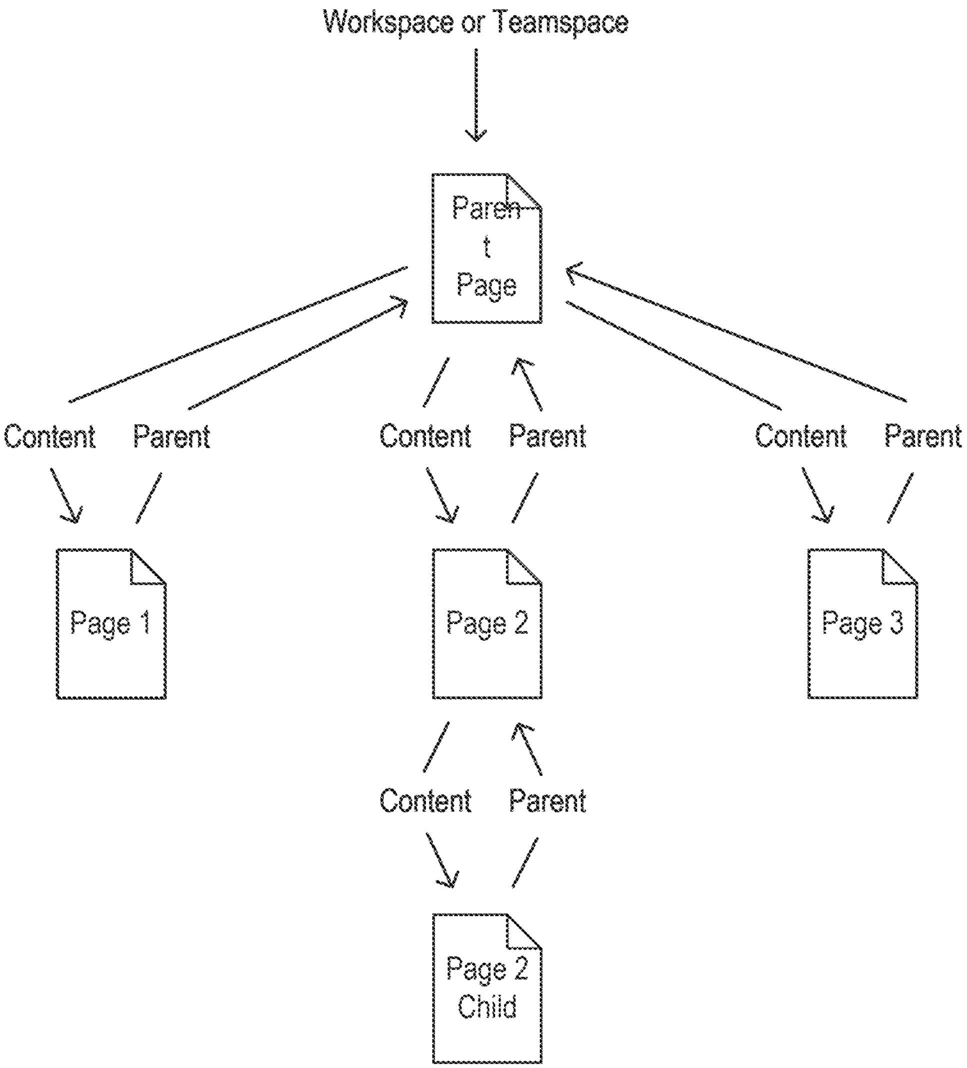
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Example Workspace Environments

Figure 4:
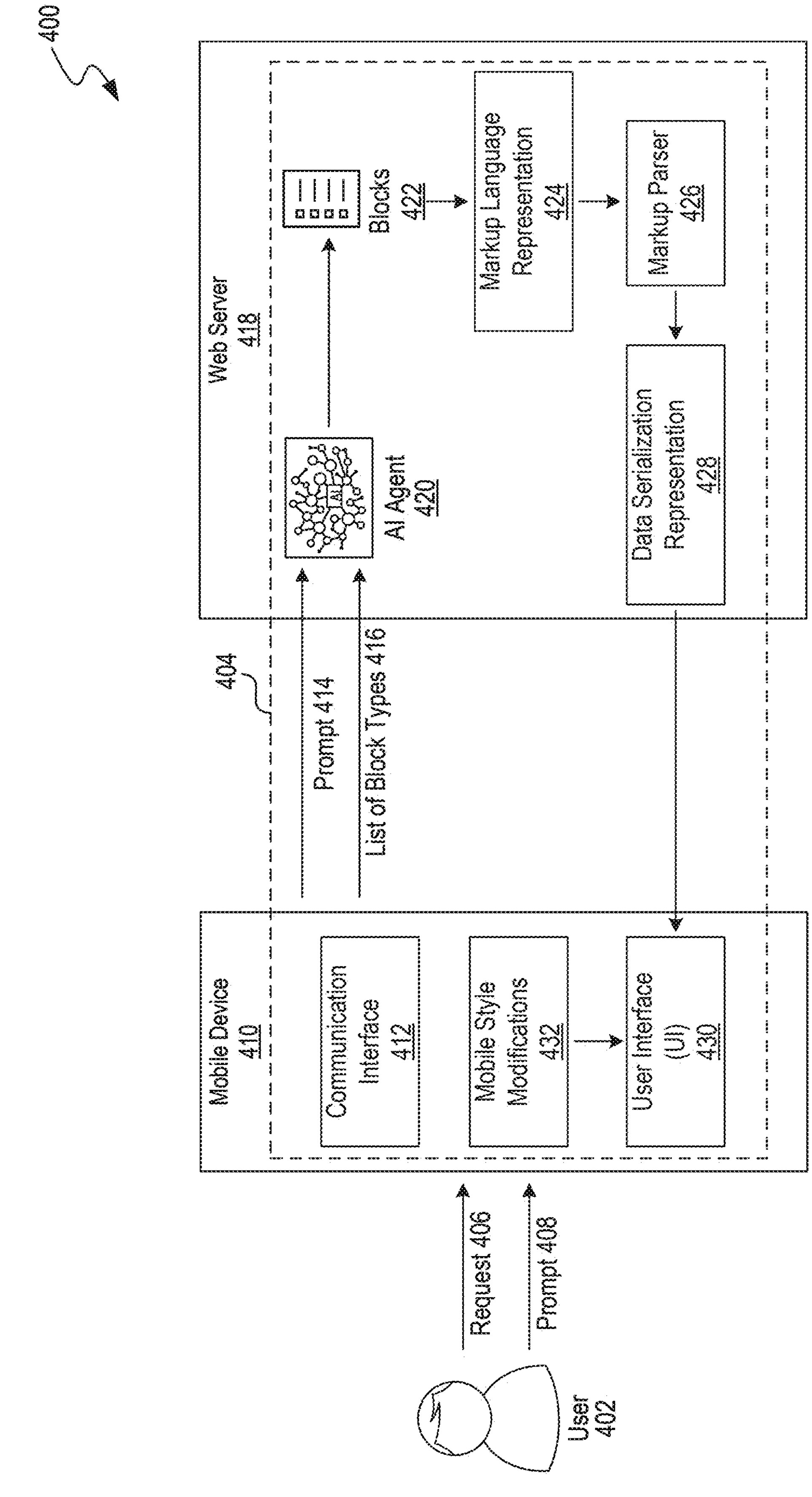
FIG. 4 illustrates an example workspace environment in which an AI agent generates responses to user prompts and the responses are configured for display on a mobile device hosting a workspace application.

FIG. 4 illustrates an example workspace environment 400 in which an artificial intelligence (AI) agent 420 generates responses to user prompts and the responses are configured for display on a mobile device 410 hosting a workspace application 404. As shown, the workspace environment 400 includes a user 402, a workspace application 404, a request 406, a prompt 408, a mobile device 410, a communication interface 412, a prompt 414, a list of block types 416, a web server 418, an AI agent 420, a block 422, a markup language representation 424, a markup parser 426, a data serialization representation 428, a user interface (UI) 430, and mobile style modifications 432. The workspace environment 400 may be implemented using components of the example computer system illustrated and described in more detail with reference to FIG. 10 below. Likewise, implementation of the example workspace environment 400 can include different and/or additional components or can be connected in different ways.

The user 402 is an individual or entity with access to the workspace application 404, which is an application or other software component providing a suite of tools for data and/or project management (e.g., Notion®). The workspace application 404 may include an AI agent 420 and a plurality of blocks. The blocks may be the same as or similar to the blocks as previously described in relation to FIG. 1 above. The mobile device 410 may be a smartphone, tablet, or other portable electronic device. In some embodiments, the mobile device 410 obtains a request 406, from the user 402, to access the workspace application 404. The request 406 from the user 402 to access the workspace application 404 may include a selection, by the user 402, of an icon associated with the workspace application 404 on the mobile device 410 (e.g., an app icon on a home screen of the mobile device 410). In some embodiments, the request 406 from the user 402 to access the workspace application 404 is a text- or voice-based input to a digital assistant (e.g., Siri, Google Assistant, Alexa) associated with the mobile device 410. In some embodiments, the request 406 to access the workspace application 404 is obtained from a third-party application. In such embodiments, the request 406 may be obtained via the third-party application. The third-party application may be an application operated on the mobile device 410. In other embodiments, the request 406 is a prompt 408 (as described below) or is included in a prompt.

In response to the request 406, a communication interface 412 for interacting with the AI agent 420 may be displayed to the user 402 on the mobile device 410. The communication interface 412 may be a text interface, audio interface, and/or another interface of the workspace application 404. In some embodiments, a prompt 408 is obtained from the user 402 via the communication interface 412. The prompt 408 may be a natural language request associated with a block 422 from the workspace application 404. Additionally or alternatively, the prompt 408 may be a natural language query, instruction, and/or other communication received from the user 402 via the communication interface 412 of the workspace application 404 that describes a task the user wishes to be performed within the workspace application 404. In some embodiments, the prompt 408 obtained from the user 402 is a text- or voice-based input to a digital assistant associated with the mobile device 410. In such embodiments, the digital assistant may have access to the workspace application 404 on the mobile device 410 and may provide the prompt 408 to the workspace application 404. In other embodiments, the prompt 408 is obtained via a third-party application on the mobile device.

In some embodiments, a prompt 414 and a list of block types 416 are provided to a web server 418 as an input for the AI agent 420. The prompt 414 and the list of block types 416 may be provided from the mobile device 410 to the web server 418. In some embodiments, the web server 418 is a combination of software and/or hardware of a different computing device than the mobile device 410 that is communicatively coupled to one or more other servers/computing devices. As depicted in FIG. 4, the workspace application 404 is distributed between the mobile device 410 and the web server 418, meaning at least one component of the workspace application 404 is hosted on each of the mobile device 410 and the web server 418. In some embodiments, the web server 418 has more computational resources (e.g., a larger memory, faster processors) than the mobile device 410 and is therefore used to execute operations of the workspace application 404 that are either not possible to execute or more inefficient to execute (e.g., slower, more error-prone, more likely to disrupt other operations of the device) using the more limited computational resources of the mobile device 410. However, in such embodiments, other operations that may be executed using fewer computational resources may still be executed on the mobile device 410, enabling faster response times (e.g., because communication between the mobile device 410 and web server 418 is not required) and/or enabling features of the workspace application 404 while a connection to the web server 418 is unavailable. The web server 418 may also be used to execute particular operations instead of the mobile device 410 because only the web server 418 is configured to enforce access permissions associated with the particular operations.

The prompt 414 may be the same as or similar to the prompt 408. In some embodiments, the prompt 414 is a processed version of the prompt 408, wherein the processed version of the prompt 408 may be a computer-readable form of the prompt 408. For example, the prompt 408 may be processed by a language model to generate the prompt 414. In such embodiments, the input of the prompt 414 to the AI agent 420 as a computer-readable form of the prompt 408 provides computational efficiencies, as the prompt 414 may contain certain indicators or context for the AI agent 420 that allows the AI agent 420 to process the prompt 414 more quickly and/or with fewer errors to determine a semantic meaning of the prompt 408 than if the prompt 414 were not processed. In some embodiments, the prompt 414 includes one or more indicators and/or a recommendation for the AI agent 420 to only use blocks from a list of block types 416 in a response to the prompt 414.

In some embodiments, the list of block types 416 includes one or more types of blocks from the plurality of blocks that are configured for rendering on the mobile device 410. The properties and attributes of various block types are discussed in relation to the "block data model" above. The types of blocks that are configured for rendering on the mobile device 410 may be types of blocks that can be formatted for display on the mobile device 410 such that data included in the block is visible and interpretable by the user 402. For example, the list of block types 416 may include plain text blocks, heading blocks, list blocks, structural blocks (e.g., dividers between other blocks), rich content blocks (e.g., that contain equations, computer code, and/or the like), layout blocks (e.g., that specify particular formatting styles), media blocks (e.g., that contain video and/or audio files), pages, databases, tables of contents, and/or synchronized blocks that are associated with other blocks. Additionally or alternatively, the types of blocks that are configured for rendering on the mobile device 410 may be text-based, such as pages including lists, rows of a database, and other text-based implementations. Rendering a block on the mobile device 410 can include rendering one or more rich text formatting features within the block, such as bolding, italicization, strikethrough, underlining, inline code, hyperlinks, citations, inline math, user mentions, emojis, line breaks, colors, and the like.

In some embodiments, the AI agent 420 is caused to generate, as output, one or more blocks 422 responsive to the prompt. The AI agent 420 is a software component that invokes an AI model or algorithm, applies the model to an input (e.g., the prompt 414), and processes the output of the model to automatically perform functions of the workspace application 404. For example, the AI agent 420 may include one or more features of the AI tool 104 and/or the transformer 212 described in relation to FIGS. 1 and 2 above, respectively. Additionally or alternatively, the AI agent 420 may invoke a commercial AI model such as GPT-4 or Claude 3.7 Sonnet. The one or more blocks 422 may be responsive to the prompt 408 when the one or more blocks 422 relate to and/or satisfy some or all of the natural language request or instruction included as part of the prompt 408. Additionally or alternatively, the one or more blocks 422 may be responsive to the prompt 408 when the one or more blocks 422, based on a determination by the AI agent 420, are predicted to be satisfactory to the user 402 as a response to the prompt 408 and/or provide the user 402 with enough information to feel as if the prompt 408 has been fulfilled and/or addressed completely.

In some embodiments, the one or more blocks 422 include a modified version of a block. In such embodiments, the block may be a page or a database of the workspace application 404 and the block may be modified by adding, deleting, and/or otherwise changing data represented therein. In some embodiments, the modified version of the block is rendered within a second UI on the mobile device 410. An indication may be obtained from the user 402 to approve modification of the block and, in response, an indication to finalize the modification to the block may be generated. This indication may alert the AI agent 420 that the modified version of the block is responsive to the prompt 408 and/or otherwise trigger the workspace application 404 to provide the modified version of the block to the mobile device 410.

As discussed in reference to the "block data model" above, each block may have a type, which defines how the block is displayed and how the block's properties are interpreted. In some embodiments, the one or more blocks 422 output by the AI agent 420 have a block type from the list of block types 416. In these and other embodiments, the one or more blocks 422 output by the AI agent 420 are output as a markup language representation 424. The markup language representation 424 is a markup language file containing a set of instructions for formatting and/or arranging elements within the one or more blocks 422 when the one or more blocks 422 are displayed (e.g., on the mobile device 410).

In some embodiments, a data serialization representation 428 of the one or more blocks 422 is obtained from a markup parser 426. In some embodiments, the markup parser 426 is hosted on the web server 418. In other embodiments, the markup parser 426 is hosted on the mobile device 410 or distributed between the web server 418 and mobile device 410. The markup parser 426 may convert the markup language representation 424 of the one or more blocks 422 into the data serialization representation 428. The data serialization representation 428 may contain the set of instructions for formatting and/or arranging elements within the one or more blocks 422 as the markup language representation 424 but be formatted as a data serialization file (e.g., a JSON, YAML, or XML file). In some embodiments, the data serialization representation 428 of the one or more blocks 422 allows the one or more blocks 422 to be more efficiently shared between the web server 418 and the mobile device 410 and/or parsed by the mobile device 410 because data serialization languages follow a stricter syntax than markup languages, enabling increased machine-readability and faster and/or less error-prone programmatic manipulation.

The one or more blocks 422 may be rendered, within a UI 430, by applying a set of mobile style modifications 432 to the data serialization representation 428. In some embodiments, the set of mobile style modifications 432 includes at least one of a font style modification or a font size modification. The set of mobile style modifications 432 may improve the readability or legibility, by the user 402, of various components/units of information of the one or more blocks 422. Various examples of mobile style modifications 432 will be described in relation to FIG. 6 below.

Figure 5:
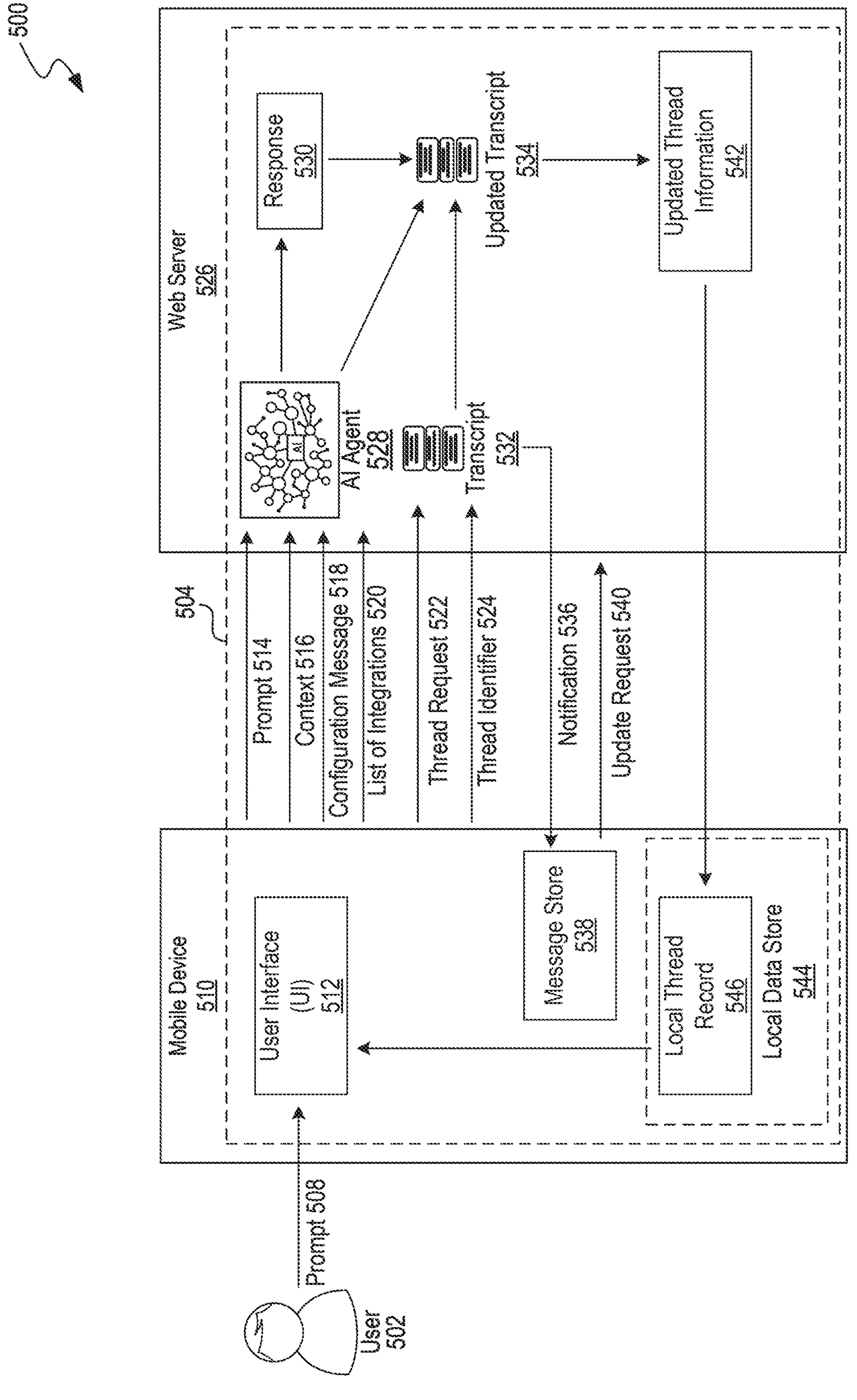
FIG. 5 illustrates another example workspace environment in which a user inputs a prompt that results in the creation and storage of a thread in a workspace application.

FIG. 5 illustrates another example workspace environment 500 in which a user 502 inputs a prompt 508, which results in the creation and storage of a thread in a workspace application 504. As shown, the workspace environment 500 includes a user 502, a workspace application 504, a prompt 508, a mobile device 510, a user interface (UI) 512, a prompt 514, context 516, a configuration message 518, a list of integrations 520, a thread request 522, a thread identifier 524, a web server 526, an AI agent 528, a response 530, a transcript 532, an updated transcript 534, a notification 536, a message store 538, an update request 540, updated thread information 542, a local data store 544, and a local thread record 546. The workspace environment 500 may be implemented using components of the example computer system illustrated and described in more detail with reference to FIG. 10 below. Likewise, implementation of the example workspace environment 500 can include different and/or additional components or can be connected in different ways.

In some embodiments, a prompt 508 is obtained from a user 502 via a UI 512. The user 502 is an individual or entity with access to the workspace application 504, which is an application or other software component providing a suite of tools for data and/or project management (e.g., Notion®). The user 502 may be the same as or similar to the user 402 as discussed in relation to FIG. 4 above. The prompt 508 may be the same as or similar to the prompt 408 as described in relation to FIG. 4 above.

In response to obtaining the prompt 508, a thread request 522 (e.g., a request to generate a thread), a thread identifier 524, a configuration message 518, a list of integrations 520, a prompt 514, and context 516 associated with the prompt 514 may be provided to a web server 526. The thread may be a persistent record of one or more entries from a transcript 532. In some embodiments, the transcript 532 represents a sequence of operations, wherein each operation is performed by either the user 502 or an AI agent 528. In some embodiments, the thread request 522 is included in the transcript 532, leading to the creation of a thread within the workspace application 504. In these and other embodiments, the thread identifier 524 can be provided from the mobile device 510 to the web server 526 alongside the thread request 522. The thread identifier 524 is a unique identifier associated with the thread. In some embodiments, the thread identifier 524 is a universally unique identifier following the version 8 standard (a "UUIDv8 identifier"). In other embodiments, the thread identifier is a universally unique identifier following another version of the standard, such as version 4 (a "UUIDv4 identifier"). The prompt 514, the context 516, the configuration message 518, the list of integrations 520, the thread request 522, and the thread identifier 524 may be transmitted to the web server 526 together in a single communication or in two or more individual communications.

In some embodiments, the configuration message 518 specifies one or more capabilities to activate for the AI agent 528. In such embodiments, the configuration message 518 may be stored as a first entry in the transcript 532. The configuration message 518 may include capabilities to activate for the AI agent 528, such as the ability to activate custom agents, automations, and integrations. In some embodiments, a custom agent is an AI agent 528 configured/customized to perform a specific task within the workspace application 504 for the user 502. The automations for the AI agent 528 may include a trigger that automatically initiates a call of the AI agent 528, in turn causing the AI agent 528 to perform one or more actions in the workspace application 504. The trigger may be an action performed within the workspace application 504, a third-party application, and/or any combination of a plurality of applications in response to which the AI agent 528 performs one or more actions.

In some embodiments, the list of integrations 520 specifies one or more integrations to activate for the AI agent 528. Each integration from the list of integrations 520 includes a set of access permissions for the AI agent 528 and a set of tools usable by the AI agent 528. The set of access permissions included in each integration may include permissions that allow the AI agent 528 to, for example, view, comment on, edit content within, or edit the structure of blocks, discussed in relation to FIG. 1, within the workspace application 504, including pages, workspaces, databases, and/or another data representation within the workspace application 504. The level of access provided to the AI agent 528 by the access permissions may be block dependent, meaning that the level of access the AI agent 528 is provided may vary across different blocks. In some embodiments, the set of access permissions includes a permission to access a third-party application. In these and other embodiments, each tool from the set of tools included in each integration, when executed, performs a particular function within the workspace application 504. For example, each tool can include a code segment or other executable computer instruction that causes the function to be performed when executed. In these and other embodiments, each tool from the set of tools is associated with a description of the particular function performed when the tool is executed.

In some embodiments, the context 516 associated with the prompt 514 includes, for example, a block identifier for at least one block in the workspace application 504. In such embodiments, the block identifier may include an identifier of the current or most recent page or database within the workspace application 504 accessed by the user 502. Additionally or alternatively, the context 516 may be expressed by the user 502 via the prompt 508, wherein the user 502 may mention a specific page, database, workspace, or other block within the workspace application 504 for the AI agent 528 to modify or otherwise use in generating a response to the prompt 508. In some embodiments, the context 516 includes a personality page, which is a page describing a set of personality characteristics for the AI agent 528 (e.g., a tone, demeanor, or the like for the AI agent 528 to use while generating natural language responses to the user 502). In such embodiments, the personality page may be included in the workspace application 504. The set of personality characteristics for the AI agent 528 may be based on previous interactions between the user 502 and the AI agent 528 within the workspace application 504.

In some embodiments, the prompt 514 is provided to the web server 526 as an input for the AI agent 528. The prompt 514 may be provided from the mobile device 510 to the web server 526 via an API request. In some embodiments, the web server 526 is a server or other system component that hosts components of the workspace application 504 and may be the same as or generally similar to the web server 418 as described in relation to FIG. 4 above. Likewise, the prompt 514 may be the same as or similar to the prompt 414 as described in relation to FIG. 4 above. In response to obtaining the prompt 514 as input, the AI agent 528 may perform an operation (e.g., execute one or more tools) to generate, as output, a response 530 to the prompt 514. In some embodiments, the web server 526 updates the transcript 532 by storing a representation of the operation as an entry in the transcript 532, storing the prompt 514 in the transcript 532, and/or storing the response 530 in the transcript 532. In some embodiments, the web server 526 also emits a first notification 536 including the thread identifier 524 and a first version identifier. The first version identifier may be an identifier associated with the thread indicating a version of the thread stored on the web server 526. As depicted in FIG. 5, the updates made by the web server 526 to the transcript 532 are stored in an updated transcript 534.

In some embodiments, after the prompt 514 is provided to the AI agent 528, a connection between the mobile device 510 and the web server 526 is interrupted. The connection between the mobile device 510 and the web server 526 may be an internet-based connection. In such embodiments, the web server 526 may update the transcript 532 while the connection is interrupted. The first notification 536 may then be received by the mobile device 510, via a message store 538, after the connection between the mobile device 510 and the web server 526 is re-established. The message store 538 is a software component of the mobile device 510 that listens for updates associated with the thread by subscribing to notification streams emitted by one or more sources of updates (e.g., the web server 526).

In some embodiments, a local thread record 546 including the thread identifier 524 and a second version identifier is generated by the mobile device 510 (e.g., after the mobile device 510 receives the prompt 508). The local thread record 546 may be stored within a local data store 544 of the mobile device 510. The local data store 544 is a combination of hardware and/or software that stores the local thread record 546 (e.g., in a page, a database, or another block) within the workspace application 504 on the mobile device 510. The local data store 544 enables the user 502 to more quickly store, access, and display data via the UI 512, as data does not need to be transmitted between the mobile device 510 and the web server 526 to do so, thereby improving the speed of certain operations of the workspace application 504. In some embodiments, the local thread record 546 is a structured data management file stored in the local data store 544. In such embodiments, the structured data management file of the local thread record 546 is a lightweight, serverless file, such as an SQLite file. In such embodiments, the use of a structured data management file to store the local thread record 546 provides computational efficiency benefits in that the local thread record 546 may be read using limited computational resources and is stored directly on the mobile device 510, eliminating the need for computationally costly operations and/or communication between the mobile device 510 and the web server 526 when the user 502 accesses or requests display of information stored in the local thread record 546. Additionally or alternatively, the storage of the local thread record 546 in the local data store 544 directly on the mobile device 510 allows for access of data by the user 502 while the mobile device 510 is offline (e.g., disconnected from the internet) or unable to connect to the web server 526.

In some embodiments, the mobile device 510 is operated in an offline capacity. In such embodiments, the mobile device 510 may be unable to communicate with the web server. Additionally or alternatively, while the mobile device 510 is offline, an indication may be obtained, from the user 502, to access a second thread. In some embodiments, a second local thread record is associated with the second thread and stored as a structured data management file in the local data store 544 of the mobile device 510. A second set of entries from the structured data management file may be extracted and one or more entries from the second set of entries may be displayed via the UI 512. Thus, the use of the local data store 544 for storing the second local thread record allows the user 502 to access information stored within the local data store 544 even when the mobile device 510 is offline (e.g., the mobile device 510 is disconnected from the internet or the mobile device 510 is not connected to the web server 526 via a physical connection, such as a LAN connection or an Ethernet connection).

In some embodiments, the mobile device 510 subscribes, via the message store 538, to receive, from the web server 526, one or more notifications associated with the thread identifier. The first notification 536 may be received via the message store 538. In embodiments where the first notification 536 is received, a determination may be made that the first version identifier emitted as part of the first notification 536 is more recent than the second version identifier included in the local thread record 546. In some embodiments, the second version identifier is associated with a second size property corresponding to the size/amount of data stored by the local thread record 546. In such embodiments, the first version identifier may be associated with a first size property corresponding to the size/amount of the data stored by the updated thread information 542. In some embodiments, the determination that the first version identifier is more recent than the second version identifier includes a determination that the first size property is larger than the second size property.

In some embodiments, in response to the determination that the first version identifier is more recent than the second version identifier, the updated thread information 542 corresponding to the first version identifier is requested, by the mobile device 510, from the web server 526. The updated thread information 542 may include a set of entries from the updated transcript 534, each entry in the set of entries having a thread display type. A thread display type is a type of entry from the transcript 532 or the updated transcript 534 that is included in the thread. For example, a message (e.g., natural language text) generated by either the user 502 or the AI agent 528, an inference made by the AI agent 528 while performing one or more operations (e.g., an agent inference step), and/or a name of or result of executing a tool may each have a thread display type (e.g., an agent tool step), enabling these entries to be displayed to the user 502 to inform the user 502 of the behavior of the AI agent 528 while the user 502 is interacting with the AI agent 528. Accordingly, the set of entries may include the prompt 508, the response 530, an agent inference step, and an agent tool usage step. In some embodiments, an agent inference step entry in the set of entries includes an indication that the AI agent 528 is "thinking" (e.g., processing the prompt 514). Additionally or alternatively, the agent inference step entry may include an indication of the steps the AI agent 528 plans to take to output the response 530 to the prompt 508 from the user 502. In some embodiments, the agent tool usage step entry in the set of entries includes an indication of the tool and/or set of tools used by the AI agent 528 to provide the response 530.

In some embodiments, the updated thread information 542 is received from the web server 526. In such embodiments, the local thread record 546 is updated by including the set of entries and replacing the second version identifier with the first version identifier, enabling the mobile device 510 to track the latest version of the thread for which the mobile device 510 has information. One or more entries from the set of entries may be displayed via the UI 512. In some embodiments, one or more entries are displayed via the UI 512 by accessing the one or more entries from the structured data management file (e.g., the local thread record 546) and applying a set of mobile style modifications to the one or more entries. The set of mobile style modifications may be the same as or similar to the set of mobile style modifications 432 as described in relation to FIG. 4 above.

Example User Interfaces

Figure 6:
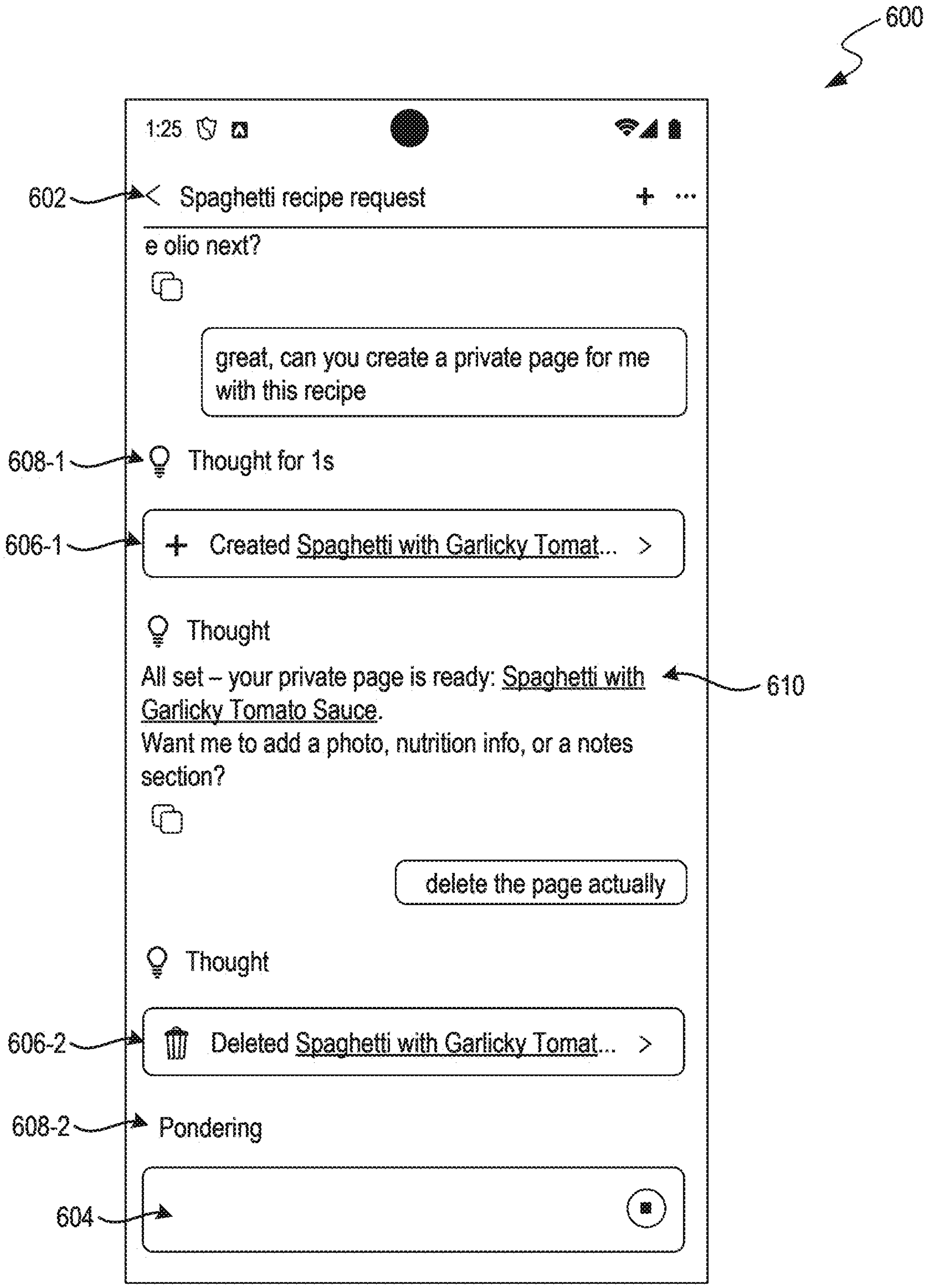
FIG. 6 illustrates an example communication interface showing a thread between a user and an AI agent in a workspace application.

FIG. 6 illustrates an example communication interface 600 showing a thread between a user and an AI agent in a workspace application. The user, the AI agent, and the workspace application may be the same as or similar to, respectively, the user 402, the AI agent 420, and the workspace application 404 as described in relation to FIG. 4 above. In some embodiments, a prompt is obtained from the user via an input field 604 of the communication interface 600. The prompt may be the same as or similar to the prompt 408 as discussed in relation to FIG. 4 above. Using the input field 604, the user can input (e.g., by typing or using speech-to-text) the prompt to be provided to the AI agent. In the illustrated example, the prompt includes a request by the user for a recipe for spaghetti from the AI agent. The AI agent may, based on the prompt from the user, assign a title 602 to the thread (e.g., Spaghetti recipe request). In the response to the prompt, the AI agent has output to the user a recipe for spaghetti, which is not shown in FIG. 6 for brevity. The user may provide further prompts to the AI agent (e.g., create a private page for the user including the previously output recipe). In some embodiments, the prompt from the user, the response from the AI agent, and representations of one or more operations performed by the AI agent to generate the response to the prompt are stored as entries in an updated transcript. The prompt, the response, and the updated transcript may be the same as or similar to, respectively, the prompt 408, the response 530, and the updated transcript 534 as described in relation to FIGS. 4 and 5 above. Likewise, the prompt, the response, and the representations may be stored in the updated transcript as described in relation to FIG. 5 above. In the continued example, the communication interface 600 includes operation indicators 608 associated with a representation from the representations of the one or more operations. As depicted, a first operation indicator 608-1 showing that the AI agent "thought for 1 second" is displayed to the user via the communication interface 600. Further, operation indicators such as a second operation indicator 608-2 indicating that the AI agent is "pondering" may also be displayed to the user via the communication interface 600. The operation indicators 608 shown in FIG. 6 are non-limiting examples of entries in the transcript that have a thread display type (as discussed in relation to FIG. 4 above) and therefore may be included in the thread.

In some embodiments, one or more entries in the transcript that have a thread display type and may be represented in the thread as action indicators 606 associated with one or more operations performed by the AI agent. The action indicators 606 may include a page creation indicator 606-1, a page deletion indicator 606-2, a page editing indicator, and/or an action indicator indicating completion of any operation by the AI agent within the workspace application in response to a prompt from the user. In the example, as shown in FIG. 6, in response to the prompt from the user requesting the creation of a page, the page creation indicator 606-1 indicating the creation of a page entitled "Spaghetti with Garlicky Tomato Sauce" is displayed to the user. In some embodiments, the user inputs a prompt including a request for the AI agent to complete a destructive action. A destructive action may be an action within the workspace application replacing or deleting data, including deleting a page, editing multiple pages at once, or deleting a database, and/or any other action deemed destructive by the AI agent. In the continued example, the user inputs a prompt including a request to delete a page (e.g., the page entitled "Spaghetti with Garlicky Tomato Sauce"). In response, a request for permission to perform a destructive action may be obtained from the AI agent. In some embodiments, the request for permission is provided to the mobile device. An approval to perform the destructive action may be obtained from the mobile device. In such embodiments, in response to obtaining the approval, the AI agent may be directed to perform the destructive action. In the illustrated example, a page deletion indicator 606-2 is output to the user via the communication interface 600, indicating that the AI agent completed the request from the user to delete the page (e.g., the page entitled "Spaghetti with Garlicky Tomato Sauce").

In some embodiments, one or more blocks may be rendered within the communication interface 600 by applying a set of mobile style modifications to a data serialization representation of the one or more blocks. The one or more blocks, the set of mobile style modifications, and the data serialization representation may be the same as or similar to, respectively, the one or more blocks 422, the set of mobile style modifications 432, and the data serialization representation 428 as described in relation to FIG. 4 above. The set of mobile style modifications may include at least one of a font style modification or a font size modification. As shown in FIG. 6, in the example in which a page is created by the AI agent in response to the prompt from the user, one block of the one or more blocks rendered to the user includes a natural language output from the AI agent including a name 610 of the page. In some embodiments, as discussed in relation to the "block data model" above, the web server may contain specific block types, block attributes, and/or block properties that govern the display of the information within the one or more blocks. The name 610 of a page may be rendered as a block on a web application, or other component of the workspace application separate from the mobile device, from the web server with a specific block rendering style, including an associated font, font size, and/or other rendering styles such as bolding or underlining. In some embodiments, the data serialization representation of the one or more blocks may include web server-specific block rendering styles. However, when the one or more blocks are rendered in the communication interface 600, the name 610 and/or other components of the one or more blocks are rendered according to the mobile style modifications 432, enabling the rendering to conform to the particular display characteristics and/or constraints of mobile devices. In the continued example, the name 610 of the page has a set of mobile style modifications applied that increase the font size and cause the name 610 of the page to be underlined. As another example, a page that includes one or more graphical elements may be rendered as a text-only list within the communication interface 600 by applying the mobile style modifications 432, thereby enabling the page to be represented within a relatively small screen space available on the mobile device without consuming the relatively higher amount of computational resources necessary to render graphics. The mobile style modifications described above are non-limiting; any set of mobile style modifications may be applied to the data serialization representation of the one or more blocks for display to the user via the communication interface 600.

In some embodiments, the one or more blocks include a modified version of the block. The block may be a page or a database within the workspace application. In some embodiments, the modified version of the block is rendered within a second user interface. The second user interface may be the same as or similar to the communication interface 600. In such embodiments, an indication may be obtained from the user to approve modification of the block. Modification of the block may include applying the set of mobile style modifications to the data serialization representation of the block. In some embodiments, an indication to finalize the modification of the block is generated.

Figure 7:
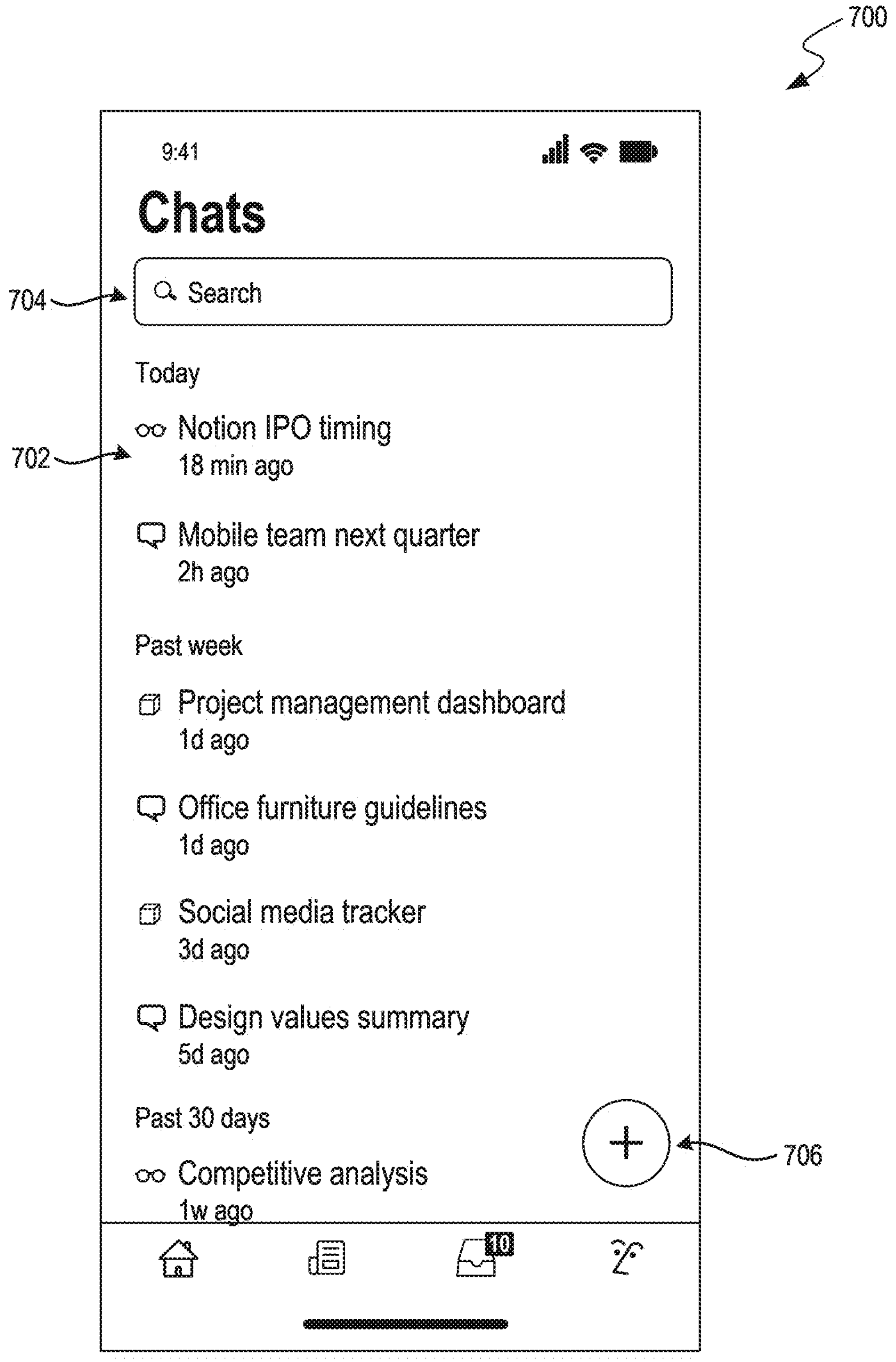
FIG. 7 illustrates a thread storage user interface (UI) via which a user may access individual threads by selecting a thread name.

FIG. 7 illustrates a thread storage UI 700 via which a user may access individual threads by selecting a thread name 702. In some embodiments, a thread is associated with a thread name 702. In such embodiments, the thread name 702 may be specified directly by the user via a prompt. In other embodiments, an AI agent may determine the thread name based on context associated with the prompt. The user, the AI agent, the context, and the prompt may be the same as or similar to, respectively, the user 502, the prompt 508, the context 516, and the AI agent 528 as described in relation to FIG. 5 above.

In some embodiments, a local thread record is stored in a local data store on a mobile device. The local thread record, the local data store, and the mobile device may be the same as or similar to, respectively, the local thread record 546, the local data store 544, and the mobile device 510 as described in relation to FIG. 5 above. The thread storage UI 700 may allow the user to search the local data store for a specific thread of the local thread record via the thread record search bar 704. Using the thread record search bar 704, the user may input (e.g., by a text- or voice-based input) the thread name 702 as stored in the local data store and/or similar words to access one or more threads in the local data store. In such embodiments, the local data store is searched and one or more threads corresponding to the thread name 702 input by the user are displayed via the thread storage UI 700. The user may select one of the one or more threads. In some embodiments, the user selecting one of the one or more threads causes the thread associated with the thread name 702 to be displayed to the user. The user may view a previous interaction with the AI agent stored within the thread in the local data store. Additionally or alternatively, the user may resume an interaction with the AI agent as part of the thread, and/or the user may begin a new interaction with the AI agent within the thread (e.g., via the communication interface 600 described in relation to FIG. 6 above). In such embodiments, the user may input a prompt to the AI agent. In embodiments where the user resumes an interaction with the AI agent or begins a new interaction with the AI agent within the thread, context associated with the prompt may include information about the resumed interaction or the previous interaction with the AI agent.

In some embodiments, the user creates a new thread by selecting a thread creation indicator 706 on the thread storage UI 700 and inputting a prompt. In such embodiments, after selecting the thread creation indicator 706, a communication interface may be displayed. The communication interface may be the same as or similar to the communication interface 600 as described in relation to FIG. 6 above.

Example Method Flows

Figure 8:
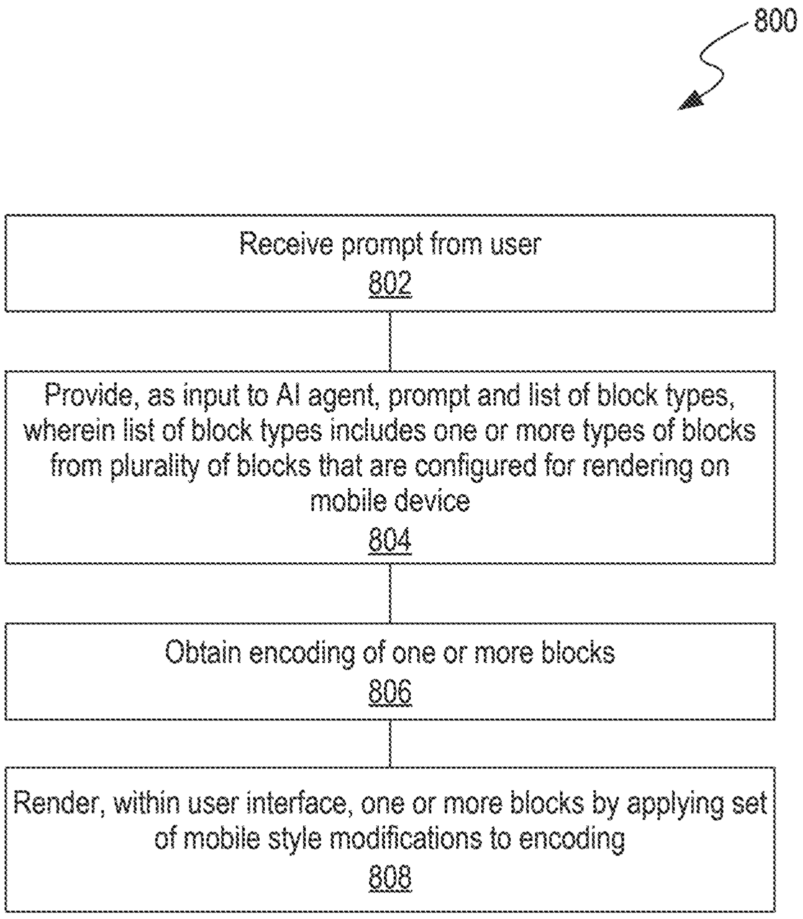
FIG. 8 is a method flow diagram illustrating an example method of rendering one or more blocks on a mobile device as a response to a prompt from a user of a workspace application.

FIG. 8 is a method flow diagram illustrating an example method 800 of rendering one or more blocks on a mobile device as a response to a prompt from a user of a workspace application. The prompt, the user, the workspace application, and the mobile device may be the same as or similar to, respectively, the prompt 408, the user 402, the workspace application 404, and the mobile device 410 as described in relation to FIG. 4 above. In some embodiments, the method 800 is performed by components of the example computer system illustrated and described in more detail in relation to FIG. 10 below and/or the platform 100 described in relation to FIG. 1 above. Likewise, embodiments can include different and/or additional operations or can perform the operations in different orders.

In operation 802, a prompt is obtained from a user. The prompt may be a natural language request associated with a block from the workspace application. The workspace application may include an artificial intelligence (AI) agent and a plurality of blocks. The AI agent can be the same as or generally similar to the AI agent 420 as described in relation to FIG. 4 above. The block can be the same as or generally similar to the blocks described in relation to the "block data model" above. In some embodiments, a request is obtained from the user to access the workspace application. In such embodiments, the request to access the workspace application and/or the prompt can be obtained from a third-party application. In some embodiments, in response to the request, a communication interface for interacting with the AI agent is displayed on the mobile device to the user. In such embodiments, the prompt may be obtained via the communication interface. The communication interface may be the same as or similar to the communication interface 600 as described in relation to FIG. 6 above.

In operation 804, the prompt and a list of block types are provided as input to the AI agent. The list of block types may include one or more types of blocks from the plurality of blocks that are configured for rendering on the mobile device. The list of block types may be the same as or generally similar to the list of block types 416 as described in relation to FIG. 4 above. The AI agent may generate, as output, one or more blocks responsive to the prompt. Each of the one or more blocks may have a type included in the list of block types. The one or more blocks can be the same as or generally similar to the one or more blocks 422 as described in relation to FIG. 4 above. In some embodiments, a request for permission to perform a destructive action is obtained from the AI agent. The destructive action may include deleting, from the workspace application, a page or a database. The request may be displayed via a second user interface to the user, an approval to perform the destructive action may be obtained from the user, and in response to obtaining the approval, the AI agent may be directed to perform the destructive action.

In operation 806, an encoding of the one or more blocks may be obtained. The encoding may be a data serialization representation of the one or more blocks obtained from a markup parser. The encoding and the markup parser may be the same as or generally similar to, respectively, the data serialization representation 428 and the markup parser 426 as described in relation to FIG. 4 above.

In operation 808, the one or more blocks are rendered within a UI by applying a set of mobile style modifications to the encoding. The set of mobile style modifications may include at least one of a font style modification or a font size modification. The set of mobile style modifications and the UI may be the same as or generally similar to the set of mobile style modifications 432 and the UI 430 as described in relation to FIG. 4 above. In some embodiments, the one or more blocks include a modified version of the block. In such embodiments, the block may be a page or a database. The modified version of the block may be rendered within a second user interface. In some embodiments, an indication is obtained from the user to approve modification of the block, and an indication to finalize the modification of the block is generated.

Figure 9:
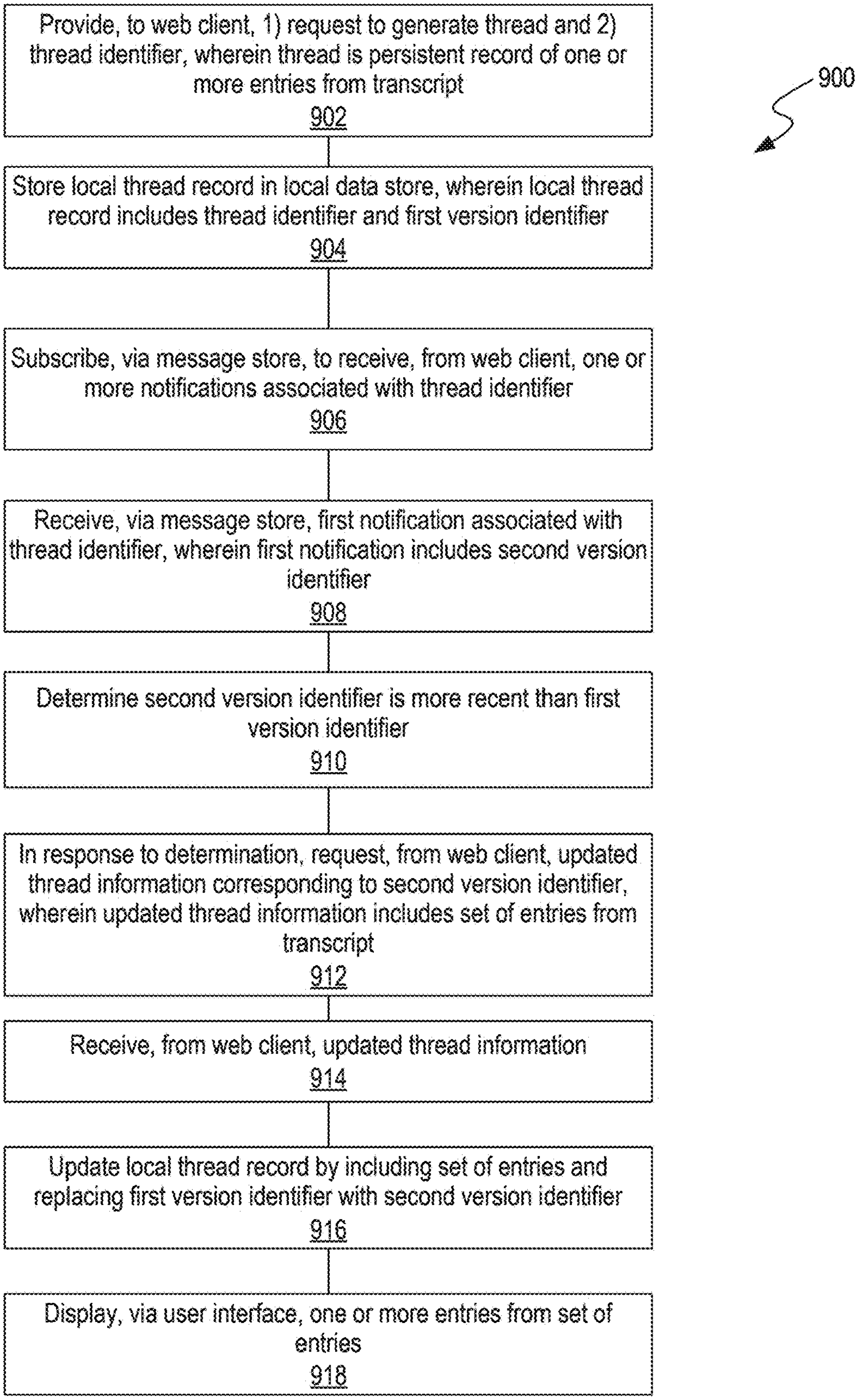
FIG. 9 is a method flow diagram illustrating an example method of managing thread synchronization between a mobile device and a web server in a workspace application.

FIG. 9 is a method flow diagram illustrating an example method 900 of managing thread synchronization between a mobile device and a web server in a workspace application.

The mobile device, the web server, and the workspace application may be the same as or similar to, respectively, the mobile device 510, the web server 526, and the workspace application 504 as discussed in relation to FIG. 5 above. In some embodiments, the method 900 is performed by components of the example computer system illustrated and described in more detail in relation to FIG. 10 below and/or the platform 100 described in relation to FIG. 1 above. Likewise, embodiments can include different and/or additional operations or can perform the operations in different orders.

In operation 902, a request to generate a thread and a thread identifier are provided to a web server. The thread may be a persistent record of one or more entries from a transcript. The transcript may represent a sequence of operations, each operation performed by either a user or an artificial intelligence (AI) agent.

A configuration message, a list of integrations, and context associated with the prompt may also be provided to the web server. The configuration message may specify one or more capabilities to activate for the AI agent. In some embodiments, the list of integrations specifies one or more integrations to activate for the AI agent. In such embodiments, each integration from the one or more integrations can include a set of access permissions for the AI agent and a set of tools usable by the AI agent. The context may include a block identifier for at least one block in the workspace application. In some embodiments, the context includes a personality page describing a set of personality characteristics for the AI agent. In such embodiments, the personality page may be included in the workspace application.

In some embodiments, a prompt is obtained from the user via a UI. In such embodiments, the prompt may be provided, as input, to the AI agent. In response to receiving the prompt as input, the AI agent may perform an operation to generate, as output, a response to the prompt. In some embodiments, the web server updates the transcript by storing a representation of the operation as an entry in the transcript, storing the prompt in the transcript, and storing the response in the transcript. The web server may emit a first notification, including the thread identifier and a first version identifier. The user, the prompt, the context, the configuration message, the list of integrations, the AI agent, the web server, the thread identifier, the transcript, the UI, and the response may be the same as or generally similar to, respectively, the user 502, the prompt 508, the context 516, the configuration message 518, the list of integrations 520, the AI agent 528, the web server 526, the thread identifier 524, the transcript 532, the UI 512, and the response 530 as described in relation to FIG. 5 above.

In operation 904, a local thread record is stored in a local data store. The local thread record may include the thread identifier and a first version identifier. The local thread record and the local data store may be the same as or generally similar to, respectively, the local thread record 546 and the local data store 544 as described in relation to FIG. 5 above. In some embodiments, the local thread record is a structured data management file stored in the local data store. In such embodiments, the structured data management file of the local thread record may be a lightweight, serverless file, such as an SQLite file.

In operation 906, a subscription is made, via a message store, to receive, from the web server, one or more notifications associated with the thread identifier. The message store may be the same as or generally similar to the message store 538 as described in relation to FIG. 5 above.

In operation 908, a first notification associated with the thread identifier is received via the message store. The first notification may include a second version identifier. The first notification may be the same as or generally similar to the notification 536 as described in relation to FIG. 5 above.

In operation 910, a determination is made that the second version identifier is more recent than the first version identifier. In some embodiments, the determination that the second version identifier is more recent than the first version identifier includes a determination that a second size property associated with the second version identifier is larger than a first size property associated with the first version identifier.

In operation 912, in response to the determination, updated thread information corresponding to the second version identifier is requested from the web server. The updated thread information may include a set of entries from the transcript, each entry in the set of entries having a thread display type. The updated thread information may be the same as or generally similar to the updated thread information 542 as described in relation to FIG. 5 above. In operation 914, the updated thread information is received from the web server.

In operation 916, the local thread record is updated by including the set of entries and replacing the first version identifier with the second version identifier. In operation 918, one or more entries from the set of entries are displayed via a UI. In some embodiments, the one or more entries are displayed by accessing the one or more entries from the structured data management file and applying a set of mobile style modifications to the one or more entries. The UI may be the same as or generally similar to the UI 512 as described in relation to FIG. 5 above.

In other embodiments, a prompt is obtained from the user via the user interface, and the prompt is provided as input to the AI agent. In response to receiving the prompt as input, the AI agent may perform an operation to generate, as output, a response to the prompt. In such embodiments, the web server may update the transcript by storing a representation of the operation as an entry in the transcript, storing the prompt in the transcript, and/or storing the response in the transcript. The web server may emit a first notification, the first notification including the thread identifier and a first version identifier. Additionally, a configuration message, a list of integrations, and context associated with the prompt may be provided to the web server. The configuration message may specify one or more capabilities to activate for the AI agent. The list of integrations may specify one or more integrations to activate for the AI agent, and each integration from the one or more integrations may include a set of access permissions for the AI agent and a set of tools usable by the AI agent. In some embodiments, the context includes a block identifier for at least one block in a workspace application. In other embodiments, the context includes a personality page describing a set of personality characteristics for the AI agent, the personality page included in a workspace application.

Computer System

Figure 10:
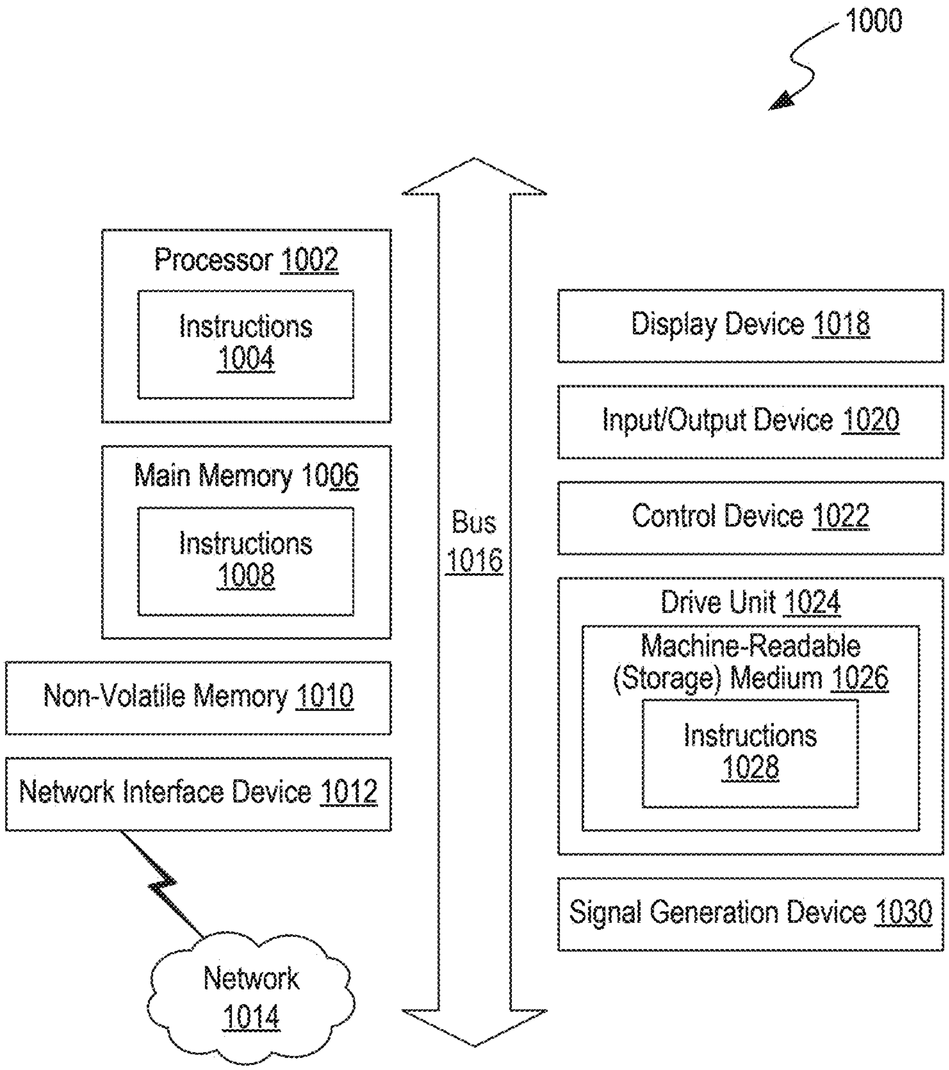
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer (SBC) system, or a distributed system such as a mesh of computer systems or include one or more cloud components in one or more networks. Where appropriate, one or more computer systems 1000 can perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a mobile device, cause the mobile device to:

obtain, via a user interface, a prompt from a user;

in response to obtaining the prompt, provide, to a web server, 1) a request to generate a thread, 2) a thread identifier, 3) a configuration message, 4) a list of integrations, and 5) context associated with the prompt, wherein the thread is a persistent record of one or more entries from a transcript, wherein the transcript represents a sequence of operations, each operation performed by either the user or an artificial intelligence (AI) agent, wherein the configuration message specifies one or more capabilities to activate for the AI agent, wherein the list of integrations specifies one or more integrations to activate for the AI agent, and wherein each integration from the one or more integrations includes a set of access permissions for the AI agent and a set of tools usable by the AI agent;

provide the prompt to the web server as input for the AI agent, wherein, in response to obtaining the prompt as input, the AI agent performs an operation to generate, as output, a response to the prompt, wherein the web server updates the transcript by 1) storing a representation of the operation as an entry in the transcript, 2) storing the prompt in the transcript, and 3) storing the response in the transcript, and wherein the web server emits a first notification, the first notification including the thread identifier and a first version identifier;

generate a local thread record including the thread identifier and a second version identifier;

subscribe, via a message store, to receive, from the web server, one or more notifications associated with the thread identifier;

receive, via the message store, the first notification;

determine that the first version identifier is more recent than the second version identifier;

in response to the determination, request, from the web server, updated thread information corresponding to the first version identifier, wherein the updated thread information includes a set of entries from the transcript, each entry in the set of entries having a thread display type, wherein entries having the thread display type are displayed, to the user, to inform the user of behavior of the AI agent, and wherein the thread display type of each entry determines a corresponding visual representation of the entry when displayed via the user interface;

receive, from the web server, the updated thread information;

update the local thread record by including the set of entries and replacing the second version identifier with the first version identifier; and display, via the user interface, one or more entries from the set of entries.

2. The non-transitory, computer-readable storage medium of claim 1, wherein the local thread record is a structured data management file stored in a local data store of the mobile device.

3. The non-transitory, computer-readable storage medium of claim 2, wherein the one or more entries are displayed by:

accessing the one or more entries from the structured data management file; and applying a set of mobile style modifications to the one or more entries.

4. The non-transitory, computer-readable storage medium of claim 1, further comprising instructions causing the mobile device to, while the mobile device is offline:

obtain an indication, from the user, to access a second thread, wherein a second local thread record associated with the second thread is stored as a structured data management file in a local data store of the mobile device;

extract a second set of entries from the structured data management file; and display, via the user interface, one or more entries from the second set of entries.

5. The non-transitory, computer-readable storage medium of claim 1, wherein:

after the prompt is provided to the AI agent, a connection between the mobile device and the web server is interrupted, the web server updates the transcript while the connection is interrupted, and the first notification is received, via the message store, after the connection is re-established.

6. The non-transitory, computer-readable storage medium of claim 1, wherein the set of entries includes the prompt, the response, an agent inference step, and an agent tool usage step.

7. The non-transitory, computer-readable storage medium of claim 1, wherein the context includes a block identifier for at least one block in a workspace application.

8. A system comprising:

at least one hardware processor; and at least one non-transitory memory storing instructions, which, when executed by the at least one hardware processor, cause the system to:

obtain, from a mobile device, a request to generate a thread and a thread identifier, wherein the thread is a persistent record of one or more entries from a transcript, and wherein the transcript represents a sequence of operations, each operation performed by either a user or an artificial intelligence (AI) agent;

obtain, from the mobile device, a prompt provided by the user as input for the AI agent;

provide the prompt, as input, to the AI agent, wherein the AI agent generates, as output, a response to the prompt;

store the prompt and the response in a transcript;

in response to storing the prompt and the response, emit a notification that the transcript has been updated, wherein the notification is associated with the thread identifier and a first version identifier;

obtain a request, from the mobile device, for updated thread information corresponding to the first version identifier, wherein the updated thread information includes a set of entries from the transcript, each entry in the set of entries having a thread display type, wherein entries having the thread display type are displayed, to the user, to inform the user of behavior of the AI agent, and wherein the thread display type of each entry determines a corresponding visual representation of the entry when displayed via a user interface; and provide the updated thread information to the mobile device, thereby causing display, on the mobile device, of one or more entries from the set of entries.

9. The system of claim 8, further comprising instructions causing the system to:

obtain, from the mobile device, 1) a configuration message, 2) a list of integrations, and 3) context associated with the prompt, wherein the configuration message specifies one or more capabilities to activate for the AI agent, wherein the list of integrations specifies one or more integrations to activate for the AI agent, and wherein each integration from the one or more integrations includes a set of access permissions for the AI agent and a set of tools usable by the AI agent; and before the AI agent generates the response to the prompt, activate the one or more capabilities and the one or more integrations for the AI agent.

10. The system of claim 9, wherein the context includes a block identifier for at least one block in a workspace application.

11. The system of claim 9, wherein the context includes a personality page describing a set of personality characteristics for the AI agent, the personality page included in a workspace application.

12. The system of claim 8, wherein the set of entries includes the prompt, the response, an agent inference step, and an agent tool usage step.

13. The system of claim 8, wherein the request for updated thread information is generated, by the mobile device, in response to the mobile device determining that the first version identifier is more recent than a second version identifier associated with a local thread record of the mobile device.

14. A method comprising:

providing, to a web server, a request to generate a thread and a thread identifier, wherein the thread is a persistent record of one or more entries from a transcript, and wherein the transcript represents a sequence of operations, each operation performed by either a user or an artificial intelligence (AI) agent;

storing a local thread record in a local data store, wherein the local thread record includes the thread identifier and a first version identifier;

subscribing, via a message store, to receive, from the web server, one or more notifications associated with the thread identifier;

receiving, via the message store, a first notification associated with the thread identifier, wherein the first notification includes a second version identifier;

determining that the second version identifier is more recent than the first version identifier;

in response to the determination, requesting, from the web server, updated thread information corresponding to the second version identifier, wherein the updated thread information includes a set of entries from the transcript, each entry in the set of entries having a thread display type, wherein entries having the thread display type are displayed, to the user, to inform the user of behavior of the AI agent, and wherein the thread display type of each entry determines a corresponding visual representation of the entry when displayed via a user interface;

receiving, from the web server, the updated thread information;

updating the local thread record by including the set of entries and replacing the first version identifier with the second version identifier; and displaying, via the user interface, one or more entries from the set of entries.

15. The method of claim 14, further comprising:

obtaining, via the user interface, a prompt from the user; and providing, as input, the prompt to the AI agent, wherein, in response to receiving the prompt as input, the AI agent performs an operation to generate, as output, a response to the prompt, wherein the web server updates the transcript by 1) storing a representation of the operation as an entry in the transcript, 2) storing the prompt in the transcript, and 3) storing the response in the transcript, and wherein the web server emits a first notification, the first notification including the thread identifier and a first version identifier.

16. The method of claim 15, further comprising:

providing, to the web server, 1) a configuration message, 2) a list of integrations, and 3) context associated with the prompt, wherein the configuration message specifies one or more capabilities to activate for the AI agent, wherein the list of integrations specifies one or more integrations to activate for the AI agent, and wherein each integration from the one or more integrations includes a set of access permissions for the AI agent and a set of tools usable by the AI agent.

17. The method of claim 16, wherein the context includes a block identifier for at least one block in a workspace application.

18. The method of claim 16, wherein the context includes a personality page describing a set of personality characteristics for the AI agent, the personality page included in a workspace application.

19. The method of claim 14, wherein the local thread record is a structured data management file stored in the local data store.

20. The method of claim 19, wherein the one or more entries are displayed by:

accessing the one or more entries from the structured data management file; and applying a set of mobile style modifications to the one or more entries.

* * * * *